United States Patent [19]
Haghighat et al.

[11] Patent Number: 5,296,296
[45] Date of Patent: Mar. 22, 1994

[54] ORDERED POLYMER/SOL-GEL MICROCOMPOSITE LAMINATES WITH GLASS ADHESIVE

[75] Inventors: R. Ross Haghighat, Acton; Robert F. Koyar, Wrentham, both of Mass.

[73] Assignee: The United States of America as represented by the Secretary of the Air Force, Washington, D.C.

[21] Appl. No.: 722,583

[22] Filed: Jun. 25, 1991

[51] Int. Cl.$^5$ ............................................. B32B 17/06
[52] U.S. Cl. ................................. 428/426; 428/427; 428/430; 428/435; 428/436; 428/437; 156/153; 156/325
[58] Field of Search ............... 428/426, 427, 430, 435, 428/436, 437; 156/153, 325; 65/18.1, 18.4, 36, 43, 901

[56] References Cited

U.S. PATENT DOCUMENTS

| | | | |
|---|---|---|---|
| 3,873,330 | 3/1975 | Sherk et al. | 65/43 |
| 3,904,426 | 9/1975 | Frieser et al. | 65/43 |
| 4,120,678 | 10/1978 | Francel et al. | 65/43 |
| 4,392,362 | 7/1983 | Little | 62/514 R |
| 4,703,287 | 10/1987 | Fournier, Jr. et al. | 332/7.51 |
| 4,842,924 | 6/1989 | Farris et al. | 428/221 |
| 4,845,150 | 7/1989 | Kovak et al. | 524/602 |

FOREIGN PATENT DOCUMENTS 0483859  9/1975  Australia ............................. 65/43

*Primary Examiner*—George F. Lesmes
*Assistant Examiner*—Timothy M. Speer
*Attorney, Agent, or Firm*—Donald J. Singer; Thomas C. Stover

[57] ABSTRACT

Provided is a method for laminating PBZT/fusible sol-gel glass microcomposite film layers by applying an adhesive of fusible sol-gel glass to the bonding surfaces of such films and compressing the film layers and the so-formed adhesive layer therebetween, at sufficient temperature and pressure to laminate the film and adhesive layers together. The sol-gel glass infiltrant and adhesive may be of the same or different materials. Desirably, the bonding surfaces of such films are roughened before application of the adhesive layer therebetween. The invention also includes the laminates prepared by the above method which laminates exhibit good coherent bonding between layers, high tensile strength and good interlaminar strength between layers for fabrication into durable high-strength space-age structures.

17 Claims, 2 Drawing Sheets

ORDERED POLYMER/SOL-GEL MICROCOMPOSITE LAMINATES WITH GLASS ADHESIVE

STATEMENT OF GOVERNMENT INTEREST

The invention described herein may be manufactured and used by or for the Government for governmental purposes without the payment of any royalty thereon.

RELATED APPLICATIONS

Related copending applications are one entitled ORDERED POLYMER MICROCOMPOSITES OF NOVEL COMPOSITION, Ser. No. 07/722,505 filed Jun. 5, 1991 in the same of R. R. Haghighat et al, as inventors and another entitled ORDERED POLYMER/SOL-GEL MICROCOMPOSITE LAMINATES WITH RESIN ADHESIVE, Ser. No. 07/722,584 filed on Jun. 25, 1991 in the name of R. F. Kovar et al as inventors, both incorporated herein by reference.

BACKGROUND OF THE INVENTION

1. Field of the Invention

This invention relates to laminates of microcomposite layers, particularly those of ordered polymer/sol-gel glass microcomposite layers laminated with glass adhesives and methods therefor.

2. The Prior Art

Ordered polymers are characterized by strong, stiff, rod-like molecules which exhibit high tensile strength but are of low compressive strength and poor interlaminar adhesion caused by buckling of the fibrillar network (of the rod-like molecule) during compression. Attempts have been made to increase such compressive strength by inserting a binder into such network which is compression resistant so as to obtain (microcomposite) structures of improved tensile strength and compressive strength.

Thus a process for fabricating such a composite in the form of a network of microfibrils of, eg. PBZT and PBO (defined below) and an interpenetrating binder of e.g. a sodium silicate mixture with a metal oxide therein is disclosed in U.S. Pat. No. 4,842,924 to R. J. Farris et al. (1989).

Another reference discloses biaxially-oriented film from ordered polymers of e.g. PBZT or PBO containing a binder of borosilicate glass in the microcomposite; see U.S. Pat. No. 4,845,150 to R. Kovak (Kovar) et al. (1989), which patents are herein incorporated by reference.

The above Kovak reference discloses preparing laminates of such microcomposite films by alternating PEEK resin film and PBZT film (with or without polyimide impregnation) in layers and applying heat and pressure thereto. A laminate of PEEK film and (impregnated) PBZT film, modified to improve compressive strength and interlaminar (between plies) strength is not suggested.

The above Farris reference states that films impregnated with matrix-forming material may be positioned in layers, e.g. per his FIG. 3, and subsequently solidified, so that the matrix material also serves to bond the individual microfibrillar network composite films together. This is a concurrent microcomposite-forming laminating step that requires e.g. 15-20% by weight of matrix material for good lamination of film layers at, however, the expense of tensile strength of such composite, particularly where such matrix material gels into a glass matrix. This is because the glass particles act as miniature knives which can cut the microfibrils when the so-impregnated film is under tension, to the detriment of the tensile strength thereof.

Clearly there is a need and market for a method for laminating microcomposite films of ordered polymers of good physical properties that overcome the above prior art shortcomings.

Reliable methods of laminating, e.g. PBZT/sol-gel glass microcomposite film layers are essential for production of high-performance applications, e.g. for spacecraft and tough, impact-resistant structures. This can place severe demands on PBZT/sol-gel microcomposite films and adhesive systems to provide adequate adhesion and interlaminar strength. The excellent chemical resistance of PBZT also makes it difficult to form strong bonds at the surface thereof, resulting in the need for surface treatment thereof or a means to impregnate such film with adhesive. In addition, the high strength and modulus of PBZT film, along with its outstanding thermal resistance means that high-performance, high-temperature adhesives must be selected to match the capabilities of such film. Accordingly, it is necessary to determine the proper surface treatment for PBZT/sol-gel film microcomposites and also to determine the suitable adhesives for laminating layers of such film together.

There has now been discovered a method for laminating microcomposite films of ordered polymers of various matrices wherein the plies thereof have a reduced amount of matrix or infiltrant therein and a reduced concentration of adhesive between such plies for the benefit of the tensile strength thereof, in which the infiltrant and adhesive can be of the same or different materials. Also discovered are the laminates produced by such method.

SUMMARY

Broadly the present invention provides a method for laminating ordered polymer/fusible sol-gel glass microcomposite film layers comprising, abrading an opposed surface of a pair of the film layers to roughen such surface, applying a fusible sol-gel glass adhesive or glass frit adhesive, to at least one of the opposed surfaces and compressing the film layers and the adhesive layer at sufficient temperature and pressure to laminate the film and adhesive layers together.

The invention further provides an ordered polymer/fusible sol-gel glass microcomposite film laminate comprising, at least two layers of such film being bonded together by a fusible sol-gel glass adhesive, at least one film surface having a rough texture next to such adhesive.

Each such film is an ordered polymer/sol-gel glass microcomposite wherein such polymer is in the form of microfibrils and the sol-gel glass matrix is penetrated between and around the microfibrils to form a microcomposite of at least two reinforcing, interpenetrating phases.

The ordered polymer (microfibrils) can be, eg. of PBZT or PBO.

By PBZT as used herein is meant:

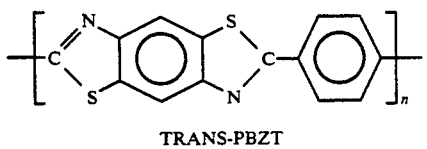

TRANS-PBZT

By PBO as used herein is meant:

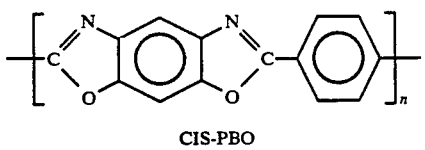

CIS-PBO

In a preferred embodiment, film surfaces adjacent the adhesive layer of such laminate are sufficiently abraded to have microfibrils in each film, exposed to close contact by such adhesive layer.

BRIEF DESCRIPTION OF THE DRAWINGS

The invention will become more apparent from the following detailed specification and drawings in which.

DESCRIPTION OF PREFERRED EMBODIMENTS

Figure 1:
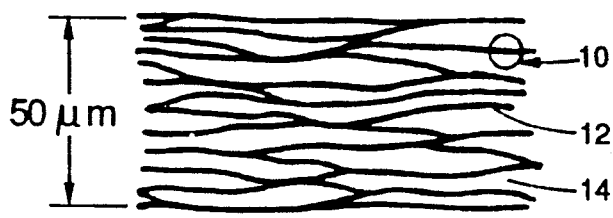
FIG. 1 shows a enlarged fragmentary cross-sectional, schematic view of wet swollen ordered polymer film employed in the method of the present invention.
Figure 2:
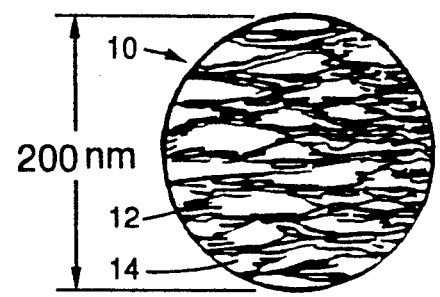
FIG. 2 is an enlarged fragmentary view of the film of FIG. 1.

Referring in more detail to the drawings, an ordered polymer film such as water-swollen PBZT film, is shown in microscopic cross-section at 50 um in FIG. 1 and in an enlarged fragment, at 200 nm per FIG. 2. In such PBZT film, microfibrils 12 hold water in the spaces 14 therebetween per FIGS. 1 and 2.

Figure 3:
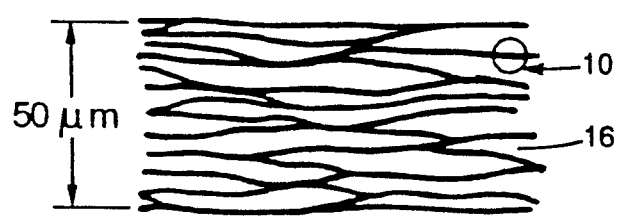
FIG. 3 is an enlarged fragmentary cross-sectional, schematic view of the film of FIG. 1 penetrated with a sol-gel glass matrix.
Figure 4:
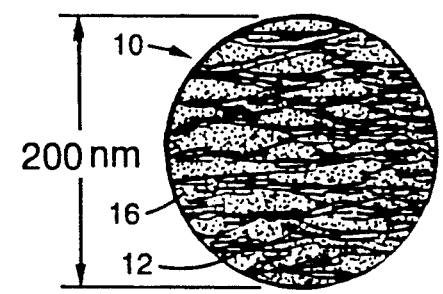
FIG. 4 is an enlarged fragmentary view of the penetrated film of FIG. 3.

According to the method of a related invention (per the first copending application, cited above), sol-gel glass matrix or binder 16 is penetrated in such film between the microfibrils 12, displacing much of the water (as more fully discussed below) as shown in FIGS. 3 and 4.

The above Figures show that the PBZT ordered polymer microfibrils are an interconnected network of highly oriented microfibrils of, e.g., 80–100 Å diameter. Into such water-swollen network is infiltrated the precursors of a sol-gel glass matrix, which is later fused to form an interpenetrating microcomposite network. Such microcomposites combine the excellent strength properties of PBZT with contributions from the ultrafine network of the infiltrant e.g. that of sol-gel glass, as described below. That is, one way to prevent the buckling of the fibrillar network of ordered polymers such as PBZT, is to fill the interstices thereof with a material of high compressive strength such as sol-gel glass binders. Since the PBZT and the glass reagent or precursors are both solution processed, a molecular scale interaction is permitted and an ultrafine microstructure is formed on a very fine scale. Thus, since PBZT/sol-gel glass are both processed from solution, their combination forms an interpenetrating, 2-phase material with homogeniety on a very fine scale (less than 1/10 um). Such material is known as a microcomposite. Ceramics and glasses exhibit high compressive strength, low tensile strength and brittle fracture. PBZT on the other hand, has exceptional tensile strength and high toughness but suffers from low compressive strength, i.e. is subject to microbuckling of the microfibrillar network during compression. Formation of a PBZT/sol-gel glass microcomposite combines the desirable properties of each component, into a new material with greatly improved properties. The sol-gel glass processing noted above, is used to introduce precursors for such sol-gel glass into the microfibrillar network of e.g. PBZT films.

For purposes of the of the microcomposites of the above first cited, related application, sol-gel glasses were sought that would achieve full or near complete densification within the thermal stability of PBZT at about 650° F. Among these glasses, lead borates and borosilicates were found to be among the highest levels of densification at temperatures below 650° to 600° C.

Thus lead borosilicate and lead borate glasses exhibit fusion temperatures of their precursors at about 500° C., well within the thermostability limits of PBZT which is about 650° C.

Advantageously, the ordered polymer employed herein is biaxially oriented. For further discussion of ordered polymer orientation, see U.S. Pat. No. 4,845,150 to R. Kovak et al (1989), previously incorporated herein by reference. For example, the key starting material for the microcomposite ordered polymer is biaxially oriented, water-swollen, coagulated PBZT film. Such film is extruded from relatively high molecular weight, high concentration PBZT solutions (50–20 wt %) commercially available. PBZT film thus prepared, was fully washed, of residual solvent and stored under neutral water for future use.

Microcomposite films of PBZT are prepared, e.g. in tubular form, which form allows pressurized stage-drying, a process that stretches the films uniformly while drying, producing smooth, wrinkle-free films as discussed below.

Figure 5:
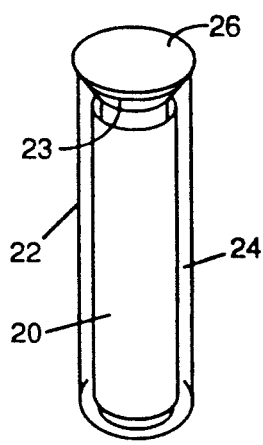
FIG. 5 is a perspective view of a sol-gel glass infiltrating apparatus employed in the present invention.

Accordingly, per the above first cited related application, a PBZT film tube 20 of, eg. a diameter of 2 in., is cut to a length of, eg. 14 in., which water-swollen tube 20 is inserted into a transparent cylindrical container 22, as shown in FIG. 5. A sol-gel precursor reagent solution 24 is added to the cylindrical container 22, the solution rising to a level above the height of such tube 20 and a stopper 26 then closes off the mouth 23 of such container 22, as shown in FIG. 5. The solution and tube thus sit in such container 22 for, eg. 8 hours, to permit infiltration of solution into such PBZT film tube to reach completion. The solution precursors in the microfibrils are shown in FIGS. 1 and 2.

Figure 6:
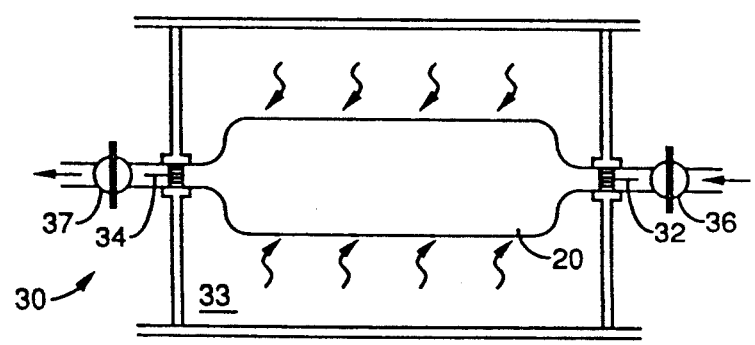
FIG. 6 is a sectional elevation schematic view of a film drying process employed in the invention.

After soaking eg. from 2 to 8 hrs., the PBZT film tube 20 thus infiltrated with sol-gel precursor solution is removed from the infiltration bath and mounted on the inlet tube 32 and outlet tube 34 of the drying apparatus 30, shown in FIG. 6.

Air inlet valve 36 and outlet valve 37 are opened, admitting pressurized air through the tube 20, while inflating it to a wrinkle-free shape, as shown in FIG. 6. The tube 20 is thus air-dried (without application of heat) within and without for 2–4 hours, during which time the precursor solution that has infiltrated into the ordered polymer microfibrils, gels and forms an interpenetrating matrix network among such microfibrils (e.g. as shown in FIGS. 3 and 4) after which the tube is ready for oven drying as discussed below.

The pressurized air continues to flow through the pressurized film tube 20, e.g. at 22 psi longitudinal force and 7 psi blowout pressure, during heating thereof. That is, heat is then applied to such gelled film tube 20 by surrounding oven 33, which employs, eg. radiant electric heat, as indicated in FIG. 6. The tube is thus stage-dried at increasing temperatures employing the steps shown in FIG. 7.

Figure 7:
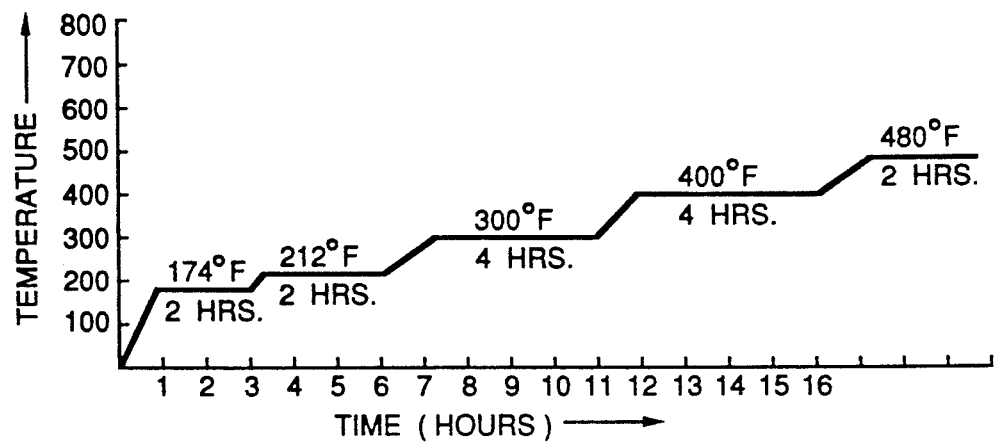
FIGS. 7 is a graph relative to the drying of the film of FIG. 6.

For comparison purposes, a film tube of water-swollen PBZT had a wet thickness of 8 mils while its thickness after stage drying, per FIG. 7, was 7 mils. Similarly, the thickness of a tube of PBZT swollen with a precursor solution of lead borate ($PbO-B_2O_3$) had a wet thickness of 4.5 mils and after stage-drying, per FIG. 7, the resultant film of PBZT/sol-gel microcomposite film had a thickness of 1.5 mils.

A further discovery in the above first cited related application, has been that ordered polymer/sol-gel glass microcomposite films can be improved by heat treatment, especially hot pressing thereof. Accordingly, such tubular films are cut open to form a flat sheet and pressed in a stainless steel mold at e.g. 900 psi and between 300°–500° C. for 30 minutes. During this process, the interpenetrated sol-glass matrix densifies, contributing to the stiffness of the microcomposites of the present invention, while leaving its tensile strength nearly intact.

Figure 8:
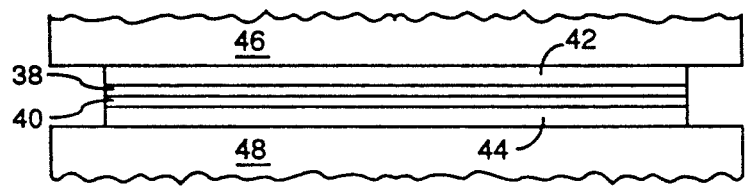
FIG. 8 is fragmentary elevation view of a hot-pressing step of film employed in the present invention and FIG. 9 is a flow block diagram of an ordered polymer/sol-gel film lamination process according to the present invention.

Thus as shown in FIG. 8, two layers of microcomposite film 38 and 40, are pressed between stainless steel mold members 42 and 44, in turn between press jaws 46 and 48, as shown in FIG. 8. One, two or more of such film layers can be so pressed at one time.

As indicated in FIG. 8, one or more ordered polymer/sol-gel glass microcomposite films can be hot-pressed and thus densified. If a plurality of such layers be hot pressed, as indicated in FIG. 8, they will be concurrently laminated together under the heat and pressure noted above and strong laminar bonding between plies will occur, particularly if the volume fraction of the infiltrant is between 15–20%. Such volume fraction range leaves sufficient coating of infiltrant on each film surface so that under the heat and pressure of hot pressing, per FIG. 8, such coatings flow and provide sufficiently strong laminar bonding between such plies.

Figure 9:
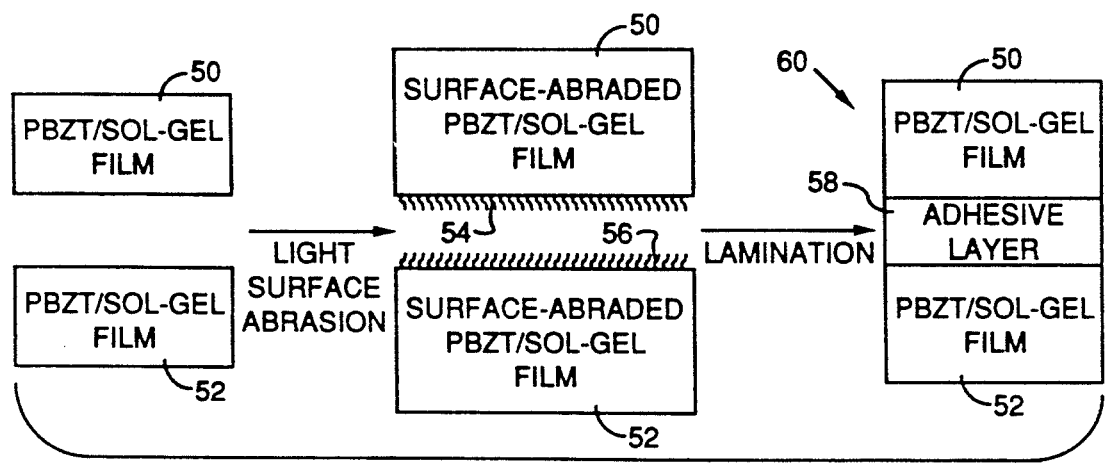

Alternatively, separator sheets of metal, eg. stainless steel or aluminum, can be placed between each film layer before and during the hot pressing step such that each layer is separately hot pressed but not bonded to the layer below and separate hot-pressed film layers result. Such separate layers can then be stored for various future uses including lamination per the method of the present invention, described below with respect to FIG. 9. Thus PBZT/sol-gel film layer 50 and corresponding film layer 52, are subjected to light surface abrasion at the interior surfaces 54 and 56 thereof as indicated in FIG. 9. Such abrasion exposes a fibrillated surface to provide strong bonding between such film layers and e.g. a fusible glass adhesive by means of mechanical entrapment. A suitable glass adhesive (described below) is then applied to one or both of the abraded film surfaces and the two film layers 50 and 52 are pressed together to form a laminate 60 having film layers 50 and 52 with adhesive layer 58 therebetween as shown in FIG. 9.

The above lamination procedure is known herein as the sequential or consecutive film lamination process while the procedure relative to FIG. 8 where unseparated film layers are hot pressed and laminated together at the same time is known herein as the concurrent lamination method. As noted above, the concurrent lamination method requires an infiltrant, that is 15–20% volume fraction in the host film so as to provide a good adhesive coating on the film surface but which can be detrimental to the tensile strength thereof as such amount of glass in the microfibrillar network can apply cutting edges thereto when the film is under tension. In the consecutive lamination method of the present invention, e.g. of FIG. 9, the volume fraction of the infiltrant in the film network need only be, eg. 1–5 volume fraction, since it does not have to act as the main laminar adhesive, the adhesive layer being externally provided as discussed above with respect to FIG. 9. In such case, the relatively reduced amount of infiltrant in the film network means a microcomposite film laminate of increased tensile strength, as less cutting edges of the glass infiltrant are presented at each of the film layers subjected to tension forces. Accordingly, the sequential or consecutive lamination method of the present invention (e.g. per FIG. 9) is preferred over the concurrent lamination method exemplified by the hot pressing procedure of FIG. 8.

In selecting suitable lamination adhesives for the microcomposite film laminates of the present invention, such adhesives are required to: 1) wet and bond strongly with the surface of the ordered polymer/sol-gel glass microcomposite film and 2) has to be sufficiently thermally stable to withstand the high use temperatures (greater than 300° C.) expected to be applied to such laminates.

After study, two types of adhesives were found suitable as discussed below: 1) fusible sol-gel glass and 2) fusible glass powders or frits.

As to the first adhesive, the use of a fusible sol-gel glass, such as lead zinc borosilicate as the adhesive for, e.g. PBZT/sol-gel glass film laminates, produces novel composite laminates that resemble "toughened" glass in their physical properties. Such laminate is harder, more rigid, higher in tensile strength and in compressive strength than heretofor available.

Such glass adhesives was chosen on the basis of its low fusion point of less than 550° C. and the potential for using it as infiltrant as well as adhesive in e.g. a PBZT/sol-gel glass film laminate.

The above and other fusible sol-gel glass adhesives found suitable for bonding laminar plies to form laminar structures according to the present invention, include the following fusibile glass adhesives:

| | |
|---|---|
| Aluminoborosilicate | (sol-gel) |

-continued

| | |
|---|---|
| Lead aluminosilicate | (sol-gel) |
| Potash soda lead | (sol-gel or frits) |
| Lead zinc borate | (sol-gel or frits) |
| Lead zinc borosilicate | (sol-gel or frits) |
| Zinc boric lead | (sol-gel or frits) |
| Sodium aluminophosphate | (preferably frits) and |
| Sodium lead phosphate | (preferably frits). |

The second type of fusible glass used as an adhesive to bond e.g. PBZT/sol-gel glass films together in a laminate, includes a commercially available series of glass powders or frits, that flow freely at temperatures below 550° C. These materials have been found according to the method of the invention to fuse to clear transparent glasses of high mechanical strength, that bond to surface-abraded ordered polymer/sol-gel microcomposite films.

Glass frits found suitable for the lamination process of the present invention include frits of the above listed compounds and other phosphate-based frits, as well as glass frits of lead borate and lead borosilicate. These frits have softening points below 550° C.

Employing lead borosilicate glass frits in certain ordered polymer/fusible sol-gel glass microcomposite film, certain laminates were prepared as discussed in the below example.

The following example is intended to provide illustrations of the present invention and should not be construed in limitation thereof.

EXAMPLE I

For such example certain PBZT/sol-gel microcomposite films were selected for lamination as follows:

1. PBZT/SiO$_2$ film/fused lead borosilicate adhesive
2. PBZT/SiO$_2$ film/fused phosphate glass adhesive
3. PBZT/borosilicate film/fused lead borosilicate adhesive
4. PBZT/lead borosilicate film/fused lead borosilicate glass adhesive and
5. PBZT/SiO$_2$ film/fused lead borosilicate glass adhesive.

The procedure for fabrication of PBZT/sol-gel disc laminates with the above glass frits adhesive included the following steps:

1. Press cutting 1-in. diameter discs from stage-dried and hot-pressed PBZT/sol-gel film tubes e.g. of FIG. 6.
2. Light abrasion of the bonding surface of each film composite to expose microfibrils for improved adhesion thereof.
3. Layup of alternating layers of PBZT/sol-gel film and its corresponding glass frits and
4. Placement of laminate into a matched metal mold and compression at pressures (400 to 1000 psi) and temperatures (300° to 550° C.) required for densification and melting of the glass adhesive and applying same for 15 to 20 minutes.

Physical data for each resulting laminate along with cure pressure and temperature are tabulated in Table I below.

TABLE 1

Properties of PBZT/Sol-Gel Disc Laminates

| Laminate Composition | No. of Piles | Laminate Thickness (mils) | Average Film Ply Thickness (mils) | Vol % PBZT | Density of Laminate (g/cc) | Wt % PBZT | Wt % Adhesive | Glass Fusion Temperature |
|---|---|---|---|---|---|---|---|---|
| PBZT/SiO$_2$fused 7575 glass | 4 | 30 | 2.9 | 39 | 5.2 | 9.3 | 90.7 | 425° C./850 psi |
| PBZT/SiO$_2$/fused phosphate glass | 5 | 49 | 1.7 | 17.3 | 2.0 | 13 | 87 | 480° C./500 psi |
| PBZT/sodium borosilicate/fused 7575 glass | 4 | 35 | 4.8 | 55 | 5.2 | 24 | 76 | 425° C./1,700 psi |
| PBZT/lead borosilicate/fused lead borosilicate glass | 5 | 31 | 1.6 | 23.4 | 3.7 | <7 | <93 | 260° C./725 psi |
| PBZT/SiO$_2$/fused lead borosilicate glass | 5 | 46 | 2.1 | 21.6 | 4.4 | 7.1 | 92.9 | 260° C./725 psi |

The above laminates were found to exhibit good physical properties including good coherent bonding, high tensile strength, high compressive resistance or strength and high sheer resistance or strength.

For example, PBZT/SiO$_2$/glass frit adhesive, having an extruded film orientation of ±34° and a sol-gel content (vol%) of 18, exhibited an average compression strength of 15.0 kpsi.

The method of the invention accordingly provides a process by which ordered polymer/sol-gel glass microcomposites are laminated, using a sol-gel derived glass or a fritted glass as the adhesive. At times within the scope of the invention, infiltrant and adhesive are or can be of the same sol-gel glass precursors or need not be. The methods of the invention allow for formation of high compressive strength laminates since the adhesive matrix is that of a low softening point glass. Such glass flows and adheres to the ordered polymer/sol-gel glass microcomposites thus forming a useful laminate of good structural properties. Such properties include e.g. compressive strengths as high as 100,000 psi for laminates where, eg. PBZT/sol-gel glass microcomposites are heat treated and hot pressed to densify the glass matrix and then laminated using a sol-gel derived glass adhesive according to the invention.

In the ordered polymer/fusable glass laminates of the invention, e.g. PBZT film, after finishing, desireably is infiltrated with 0.1 to 45.0 vol. % of a reinforcing matrix such as SiO$_2$. A preferred range has been found to be 1 to 10 vol% of matrix in the ordered polymer, and more preferred is 1 to 5 vol %. for high tensile strength, high compressive strength and high intralaminar strength and toughness.

Also, in the above laminates, after finishing, a range of 7-25 vol % of glass adhesive is suitable, although a range of 10 to 13 vol % is preferred, to obtain a high strength laminate with strong interlaminar adhesion (between plies).

Rather than vol. %, wt.% can also be employed in the above laminate measurements, if desired, per the invention, as indicated in Table I hereof.

Accordingly, the invention provides methods for high-strength laminate formation and the laminates produced thereby. The invention further provides for manufacture of strong and/or thick laminate structures, including PBZT/sol-gel glass film composites, for high performance aerospace, aircraft and other structures.

What is claimed is:

1. A method for laminating ordered polymer/sol-gel glass microcomposite film layers comprising, forming at least two separate film layers, roughing an opposed surface of a pair of said film layers, applying fusible glass adhesive which fuses below 550° C., to at least one of the opposed film surfaces and compressing said film layers and said adhesive layer therebetween, at sufficient temperature and pressure to laminate said film and adhesive layers together.

2. The method of claim 1 wherein each film layer has been previously biaxially oriented, infiltrated with sol gel glass precursors, dried and hot pressed before laminating.

3. The method of claim 1 wherein said glass adhesive is selected from the group consisting of sol-gel glass or glass frits which fuse below 550° C.

4. The method of claim 1 wherein said film and adhesive layers are heated to between 300° C. to 550° C.

5. The method of claim 1 wherein said film and adhesive layers are pressed together at 400 to 1000 psi.

6. The method of claim 1 wherein a bonding surface of each of said microcomposite films is abraded to expose microfibrils in each surface.

7. The method of claim 1 wherein said ordered polymer is one selected from the group consisting of PBZT and PBO.

8. An ordered polymer/sol-gel glass microcomposite laminate comprising, at least two preformed and separate microcomposite layers each layer having at least one sol-gel glass infiltrant, said layers being bonded together by a fusible glass adhesive in a range of 7-25 vol. %, at least one of said layers having an abraded or roughened surface next to said adhesive and at least one of the infiltrants in said layers being of different composition than said adhesive.

9. The laminate of claim 8 wherein each microcomposite layer has been biaxially oriented, infiltrated, dried and hot pressed before lamination.

10. The laminate of claim 8 wherein said rough surface has microfibrils therein exposed to said adhesive.

11. The laminate of claim 8 wherein said glass adhesive fuses below 550° C.

12. The laminate of claim 8 wherein said adhesive is a fusible sol-gel derived glass.

13. The laminate of claim 8 wherein said adhesive is fusable glass frits.

14. The laminate of claim 8 wherein said ordered polymer is a polymer selected from the group consisting of PBZT and PBO.

15. The laminate of claim 8 wherein said ordered polymer is a layer selected from the group consisting of PBZT film, PBZT/$SiO_2$ film, PBZT/borosilicate film, PBZT/lead borosilicate film and PBZT/$SiO_2$ film.

16. The laminate of claim 8, having layers selected from the group consisting of PBZT/$SiO_2$film/fused lead borosilicate glass adhesive, PBZT/$SiO_2$ film/fused phosphate glass adhesive, PBZT/borosilicate film/fused lead borosilicate glass adhesive, PBZT/lead borosilicate film/fused lead borosilicate glass adhesive and PBZT/$SiO_2$ film/fused lead borosilicate glass adhesive.

17. The laminate of claim 8 wherein said glass adhesive is a fusible sol-gel glass or a fusible sol-gel derived glass powder or frits selected from the group consisting of aluminum borosilicate, lead aluminosilicate, potash soda lead, lead zinc borate, lead zinc borosilicate, zinc boric lead, sodium aluminophosphate, sodium lead phosphate, lead borate and lead borosilicate.

* * * * *